United States Patent Office 2,957,865
Patented Oct. 25, 1960

2,957,865
RECOVERY OF COBALAMINS

Arthur Finchler, Bronx, N.Y., assignor to
Chase Chemical Company, Newark, N.J.

No Drawing. Filed Oct. 15, 1959, Ser. No. 846,560

13 Claims. (Cl. 260—211.5)

This invention relates to a process for recovering cobalamins, and more particularly to a process for separating cobalamins from addition products thereof with methylene disalicylic acid and similar substituted aromatic hydroxycarboxylic acids and the like, as will be described more fully hereinafter.

In U.S. Patent No. 2,861,025 there is disclosed and claimed a process for extracting cobalamins from aqueous solutions containing the same involving the use of certain substituted aromatic hydroxycarboxylic acid compounds, preferably methylene disalicylic acid. By this process, there is produced an addition product or complex of the cobalamin with the methylene disalicylic acid or similar compound. Certain methods are disclosed in the patent for cleaving or separating the cobalamin from this addition product, including washing with acidified water, and such solvents as benzyl alcohol, phenols, cresol, chlorinated cresols and the like. Such methods for separating the cobalamins from their addition products are subject to certain disadvantages with respect to cost, difficulty of operation, inefficiency of separation and/or degradation of the cobalamins or the like.

It is an object of this invention to provide an improved process for separating cobalamins from addition products thereof with methylene disalicylic acid and similar acids of the type disclosed in said patent. Another object of this invention is the provision of an improved process for separating cobalamins from such addition products which will not be subject to the above disadvantages. Other objects and advantages will appear as the description proceeds.

Attainment of the above objects is made possible by the present invention which comprises contacting an aqueous solution of said addition product at a pH of about 4.7 to 7.0 with a carboxylic ion exchange resin which has been prepared by (1) treatment at a pH of more than 7 with an aqueous alkali metal hydroxide solution followed by (2) adjustment of the pH of the resin to about 4.7 to 7.0, whereby said cobalamin is selectively affixed to said resin. This process has been found to be not subject to the above mentioned disadvantages. As a further advantage, the methylene disalicylic acid cleaved or separated from the addition product is rejected or not absorbed by the carboxylic ion exchange resin, whereby it is recovered in the form of its alkali metal salt in the aqueous effluent in a condition readily employed for reuse in the above mentioned patent for extracting further portions of cobalamins from aqueous solutions thereof. The cobalamins affixed to the carboxylic ion exchange resin may then be readily recovered by treating the resin with an aqueous alkali metal hydroxide solution. In this manner the carboxylic ion resin is simultaneously regenerated to the alkali metal form thereof, and is in condition for reuse in the above defined process of this invention for separating further portions of cobalamins from addition products thereof. Desirably, before removing the cobalamin from the carboxylic ion exchange resin, the resin is washed in order to remove residual amounts of methylene disalicylic acid alkali metal salt. This washing may be carried out by use of acetone, water, or similar solvent for the methylene disalicylic acid salt, and preferably this washing is preceded by a washing of the resin with a small amount of buffer at a pH within the said range of about 4.7 to 7.0.

The operativeness of the process of this invention could not have been predicted from a knowledge of the prior art since it is well known that when a mixture of cobalamins and another substance is contacted with a carboxylic ion exchange resin, the said other substance is selectively affixed to the resin and the cobalamins are rejected. This selective action in fact forms the basis of the known process for recovering streptomycin from the fermentation broth in which both the streptomycin and cobalamins are produced, such recovery of the streptomycin being effected by contacting the fermentation broth with a carboxylic ion exchange resin whereby the streptomycin is adsorbed and/or affixed to the resin and the cobalamins are rejected and found in the so-called waste streptomycin liquor. The recovery of streptomycin in this manner is disclosed for example in U.S. Patents 2,643,210 and 2,703,302 and other patents and literature references, the inoperativeness of carboxylic ion exchange resins for selectively adsorbing cobalamins from aqueous solutions in the presence of other substances being further summarized in U.S. Patent 2,702,263. It was accordingly highly surprising and unexpected to find that the process of the present invention succeeds in removing in one step the cobalamins from their described addition products by adsorbing or affixing the cobalamins and rejecting the other substance, in this instance the methylene disalicylic acid or similar acid.

The term "cobalamin" is recognized and is intended to generically include vitamin $B_{12}$ and vitamin $B_{12}$-like substances, namely all those substances which are generally regarded as belonging to the vitamin $B_{12}$ group, i.e., those which exhibit vitamin $B_{12}$ activity irrespective of their chemical structure and having in common the biological functions and related biological properties attributed to such substances.

As disclosed in said U.S. Patent 2,861,025, the methylene disalicylic acid is preferred for use in the patented process for the extraction or recovery of cobalamins. Accordingly, the process of the present invention will be for the most part described with respect to the separation of cobalamins from addition products thereof with methylene disalicylic acid, but it will be understood, and is so intended, that the present process is also operative for the separation of cobalamins from addition products thereof with other compounds selected from the group consisting of hydroxynaphthoic, methylene-bis-hydroxybenzoic and methylene-bis-hydroxynaphthoic acids and nuclearly substituted lower alkyl, phenyl, halo and nitro hydroxybenzoic, hydroxynaphthoic, methylene-bis-hydroxybenzoic and methylene-bis-hydroxynaphthoic acids. Numerous examples of such acids are disclosed in said patent. It will be also understood that the process of this invention will also be found useful in the separation or cleavage of addition products of cobalamins with other carboxylic acids.

Carboxylic ion exchange resins which are useful in the process of this invention are well known in the art and generally owe their activity to the presence of free carboxylic acid groups or equivalent in the resin polymer chain. They must of course be insoluble in order to be operative in the liquids being treated and are preferably infusible. Generally and desirably, the resin is employed in the present process in granular or other particulate form since the finer the particle size, the more surface of resin that is exposed and the more effective the resin is in removing ions from solution. Resins obtained by copolymerizing and/or cross linking polyacrylic acid or polymethacrylic acid with divinyl aromatic compounds such as divinylbenzene may be employed in addition to other known carboxylic ion exchange resins. A specific example is the granular copolymer of methacrylic acid and divinylbenzene containing 5% divinyl benzene. These and other resins operative in the present process are disclosed in U.S. Patent 2,340,111 and other patents, in addition to the patent application Serial No. 288,951, filed on May 20, 1952, by Edwin N. Lightfoot, Jr. A number of these resins are available commercially, particularly by the Rohm and Haas Co. under the name "Amberlites" e.g. Amberlite IRC-50, Amberlite XE-89 and the like.

The carboxylic ion exchange resin as employed in the process of this invention must be conditioned to a proper pH value in order to obtain optimum adsorption functions, and also to avoid precipitation of the methylene disalicylic acid or its addition product with the cobalamin. The latter substances precipitate or tend to precipitate at a low pH, which may be below about 4.0. Accordingly, the resin employed for the absorption treatment of the solution of addition product should have a pH of about 4.7 to 7.0. Further, the resin should preferably be in the alkali metal salt-free acid form, in which a certain proportion of the carboxylic acid groups in the polymer chain exist in the form of the salt with an alkali metal ion, namely potassium ion or preferably sodium ion. This is accomplished by treatment of the free acid form of resin with an alkali metal hydroxide solution (potassium hydroxide or preferably sodium hydroxide, ca. 2–10% aqueous) or equivalent water soluble alkaline metal salt of a weak acid, e.g. acetate, carbonate, citrate, etc., at a pH of more than seven, followed by adjustment of the pH of the resin to about 4.7 to 7.0. This adjustment may be carried out by treatment with any suitable acid or buffer, preferably an acetic acid-sodium acetate buffer solution. The treatment of the resin with the buffer solution is continued until the effluent has reached the desired pH of about 4.7 to 7.0.

The solution of addition product treated in accordance with the process of this invention must also be within the same pH range of 4.7 to 7.0 in order to insure that no precipitation of the methylene disalicylic acid or its addition product with the cobalamins takes place, since this would tend to clog the resin and of course prevent efficient separation of the cobalamins from the methylene disalicylic acid addition product thereof. By way of example, the cobalamin-methylene disalicylic acid addition product may be suspended in water and the suspension treated with a sufficient amount of concentrated aqueous sodium hydroxide or potassium hydroxide (ca. 10–35% conc.) or equivalent water soluble alkali metal salt of a weak acid, to dissolve the addition product. Generally, this will result in a solution having a pH of about 5.5 to 6.5. A minimum amount of alkaline-reacting agent is employed in order to provide as concentrated a solution of addition product as possible in the interest of efficient absorption by the carboxylic ion exchange resin. This concentrated solution of addition product is then preferably treated with buffer until the pH of the solution is approximately, though not necessarily at about the same pH as the carboxylic ion exchange resin prepared as above described.

According to the process of this invention, the aqueous solution of addition product is passed slowly through the prepared carboxylic ion exchange resin, preferably using the column technique, so as to prevent channeling and to afford complete adsorption of the cobalamin and rejection of the sodium salt of the methylene disalicylic acid. It will be understood that in this step, the cobalamin complexes with the carboxylic acid groups present in the ion exchange resin, while allowing the sodium salt of methylene disalicylic acid to pass through the column. Following this absorption step, the resin containing the cobalamin affixed thereto is, desirably after washing with a small amount of buffer at the pH range of 4.7 to 7.0, washed with acetone or water to remove all of the occluded sodium salt of methylene disalicylic acid as well as any undesired brown colored material.

To recover the cobalamin from the carboxylic ion exchange resin, the resin is desorbed by elution with an aqueous sodium hydroxide solution preferably of about 4 to 10% strength, or a corresponding aqueous solution of potassium hydroxide whereby the cobalamin is removed and washed out of the resin which is simultaneously regenerated to the salt form. The eluted cobalamin solution is usually at a neutral or possibly alkaline pH, at which pH the cobalamin cannot be kept for extended periods of time without degradation. Accordingly, this solution is preferably adjusted to an acid pH as for example, of about 4 to 6 with an acid solution, for example concentrated sulfuric acid or the like. The cobalamin in this solution may then be employed as such or recovered in any desired manner, as for example, by evaporation in vacuo, freezing and drying while in a frozen state, recrystallization, further purification by absorption on charcoal, alumina or silica gel, or other known purifying and recovery techniques. Preferably this solution of cobalamin is treated with a source of cyanide ion, preferably solid sodium cyanide, until an alkaline pH is reached. This treatment with cyanide ion improves the yield of the cobalamin, specifically vitamin $B_{12}$. For reasons given above this alkaline solution of cobalamin is then again acidified to prevent degradation of the cobalamin.

While certain specific acids, bases and buffers have been mentioned above, it will be understood that adjustment of the pH of the resin and the various solutions of cobalamins and addition products may be carried out with any of the usually employed acids, bases or buffers. Thus, suitable acids include acetic acid, hydrochloric acid, sulfuric acid and the like, and suitable bases include sodium hydroxide, potassium hydroxide and their salts of weak acids, ammonium hydroxide and organic bases such as pyridine, tributylamine, picoline and the like. Any suitable buffer may be employed, as for example those of the phosphate, acetate, citrate or phthalate systems or the like. Specific examples of such buffers include acetic acid-sodium acetate, citric acid-sodium citrate, sodium hydrogen phthalate-sodium hydroxide, sodium dihydrogenphosphate-sodium hydroxide, phosphoric acid-sodium phosphate and the like.

In accordance with generally recognized principles, passage of buffer solutions, solutions of addition product, eluents, washes and other solutions through the carboxylic ion exchange resin should be carried out at a slow enough rate to permit the desired action and/or equilibrium to take place with the minimum quantity of solution. For this reason, the rates of thruput of any solution through the carboxylic ion exchange resin should usually fall within the range of about 0.03 to 0.4 milliliter per minute per milliliter of resin. Since the time taken for passage of any solution through the resin column effects the cost of operation of the present process, it will be understood that in any particular instance the rate of thruput will be determined by consideration and a balancing of various factors. Too fast a rate of thruput will tend to promote channelling, packing of the resin and the like which would of course, reduce the efficiency of adsorption, desorption, etc.

While sodium cyanide was mentioned above in connection with the treatment of the eluate containing the cobalamin, it will be understood that other sources of cyanide ion may be employed, as for example, the ammonium cyanide, metal cyanides such as the alkali metal and alkaline earth metal cyanides including sodium, potassium, barium, calcium and strontium cyanides, and alkali metal ferrocyanides and ferricyanides and the like may also be employed. Alternatively, liquid or gaseous hydrocyanic acid or hydrogen cyanide may be employed for the treatment. In fact, in some instances, it may be preferable to also carry out a treatment with cyanide ion prior to the separation process of this invention, as for example by treatment of the aqueous suspension (at pH below 5.0) or solution (pH above 5.0) of addition product with cyanide ion to reach an alkaline pH, followed by adjustment of the pH of the solution with buffer to a pH of about 4.7 to 7.0. The cyanide-treated aqueous solution of addition product may then be treated with carboxylic ion exchange resin in accordance with the present process as described above. Such treatment of the suspension of addition product simultaneously serves to dissolve the same.

Although acetone or water were referred to above as suitable solvents for use in washing occluded sodium salt of methylene disalicylic acid from the resin containing the cobalamin affixed thereto, it will be understood that other aqueous or organic solvents may be employed which are solvents for the methylene disalicylic acid salt and non-solvents for the cobalamins. Such solvents, include, in addition to acetone, methyl ethyl ketone, chloroform and the like.

The following example is only illustrative of the process of this invention and is not to be regarded as limitative. It will be understood that all parts and proportions referred to herein are by weight unless otherwise indicated.

Example 15.0 grams of dry granular Amberlite IRC–50 carboxylic ion exchange resin (free acid) is soaked in water for two hours, and transferred to a column (11 mm. x 205 mm.). The column is then treated with 85.0 cc. of 4% aq. NaOH to give an alkaline effluent. The column is allowed to remain in contact with the alkaline solution for one hour (11 x 355 mm. at end of this period). The column is back-washed one hour with tap water, then washed with a sodium acetate-acetic acid buffer at pH 4.7. (Buffer made by using a molar quantity of each reagent in 1 liter of water.) The column requires 97 cc. of buffer to give an effluent with pH=4.75. An additional 13 cc. of buffer is run through as a wash. Next, a buffer solution at pH 5.1 (containing 10.211 grams of potassium hydrogen phthalate and 23.5 cc. of 0.100 NaOH solution diluted to 1 liter) is used to wash the column and requires 35.0 cc. to give a final pH of 4.93. The column is then 11 mm. x 295 mm.

1.000 gram of acetone washed cobalamin-methylene disalicylic acid addition product is suspended in 20 cc. of water. Aqueous sodium hydroxide solution (30%) is added until everything dissolves and pH is 5.5. Buffer solution (sodium acetate-acetic acid) of pH 4.5 is then added until the final pH of the solution of addition product is 5.0–5.1. This solution is then run through the above prepared resin column at such a rate, so that most of the cobalamin is adsorbed on the upper half of the column.

The column is washed first with 30 cc. of buffer solution (sodium hydrogen phthalate-sodium hydroxide) at pH 5.1, then with 30 cc. of pure acetone. This removes the residual colored impurities as well as the small remaining amount of sodium salt of methylene disalicylic acid.

The column is then desorbed by backwashing with 8% aqueous sodium hydroxide solution at such a rate that the cobalamin is removed in a liquid band equal to 20–30 cc. The eluate is adjusted to a pH=4.5 with concentrated sulfuric acid. Then solid sodium cyanide is added until the pH reaches 7.5 to 8.0. The solution turns a deep purple, and is stirred at this pH for 15 minutes or longer. The pH is then adjusted to 4.50 with dilute 1 N sulfuric acid. This red concentrated solution of cobalamin is concentrated in vacuo to one-tenth its original volume. The concentrated solution is poured on 10.0 grams of mannitol and vacuum dried 1.5 hours at 66° C., and about 20 mm. pressure. A biochemical assay by *Lactobacillus leichmanii* organism according to the U.S.P. XV shows a recovery of 63% of the initial activity. An additional 22% of activity is recovered by recycling washes and methylene disalicylic acid salt eluates to the next run.

This invention has been disclosed with respect to certain preferred embodiments, and various modifications and variations thereof will become obvious to persons skilled in the art. It is to be understood that such modifications and variations are to be included within the spirit and scope of this invention.

What I claim is:

1. A process for separating a cobalamin from an addition product of said cobalamin with methylene disalicylic acid comprising contacting an aqueous solution of said addition product at a pH of about 4.7–7.0 with a carboxylic ion exchange resin which has been prepared by (1) treatment at a pH of more than 7 with an aqueous alkali metal hydroxide solution followed by (2) adjustment of the pH of the resin to about 4.7–7.0, whereby said cobalamin is selectively affixed to said resin.

2. A process as defined in claim 1 wherein said alkali metal hydroxide is sodium hydroxide.

3. A process as defined in claim 1 wherein said aqueous solution of addition product and said resin are both at a pH of about 4.9–5.5 when contacted.

4. A process for separating a cobalamin from an addition product of said cobalamin with methylene disalicylic acid comprising contacting an aqueous solution of said addition product at a pH of about 4.7–7.0 with a carboxylic ion exchange resin which has been prepared by (1) treatment at a pH of more than 7 with an aqueous alkali metal hydroxide solution followed by (2) adjustment of the pH of the resin to about 4.7–7.0, whereby said cobalamin is selectively affixed to said resin, and treating said resin carrying said cobalamin affixed thereto with an aqueous alkali metal hydroxide solution to recover said cobalamin.

5. A process defined in claim 4 wherein said alkali metal hydroxide is sodium hydroxide.

6. A process as defined in claim 4 wherein said aqueous solution of addition product and said resin are both at a pH of about 4.9–5.5 when contacted.

7. A process for separating a cobalamin from an addition product of said cobalamin with methylene disalicyclic acid comprising contacting an aqueous solution of said addition product at a pH of about 4.7 to 7.0 with a carboxylic ion exchange resin which has been prepared by (1) treatment at a pH of more than 7 with an aqueous alkali metal hydroxide solution followed by (2) adjustment of the pH of the resin to about 4.7–7.0, whereby said cobalamin is selectively affixed to said resin, washing said resin with selective solvent to remove residual alkali metal salt of methylene disalicylic acid, and then treating said resin carrying said cobalamin affixed thereto with an aqueous alkali metal hydroxide solution to recover said cobalamin.

8. A process as defined in claim 7 wherein said alkali metal hydroxide is sodium hydroxide.

9. A process as defined in claim 7 wherein said aqueous solution of addition product and said resin are both at a pH of about 4.9–5.5 when contacted.

10. A process as defined in claim 7 followed by treatment of the resulting aqueous solution of cobalamin with a source of cyanide ion.

11. A process as defined in claim 10 wherein said source of cyanide ion is sodium cyanide.

12. A process as defined in claim 1 wherein said addition product is treated with a source of cyanide ion prior to contact thereof with said resin.

13. A process as defined in claim 12 wherein said source of cyanide ion is sodium cyanide.

References Cited in the file of this patent

UNITED STATES PATENTS

| | | |
|---|---|---|
| 2,830,933 | Bonchard | Apr. 15, 1958 |
| 2,861,025 | Baron | Nov. 18, 1958 |
| 2,914,524 | Ziegler | Nov. 24, 1959 |